Figure 1:
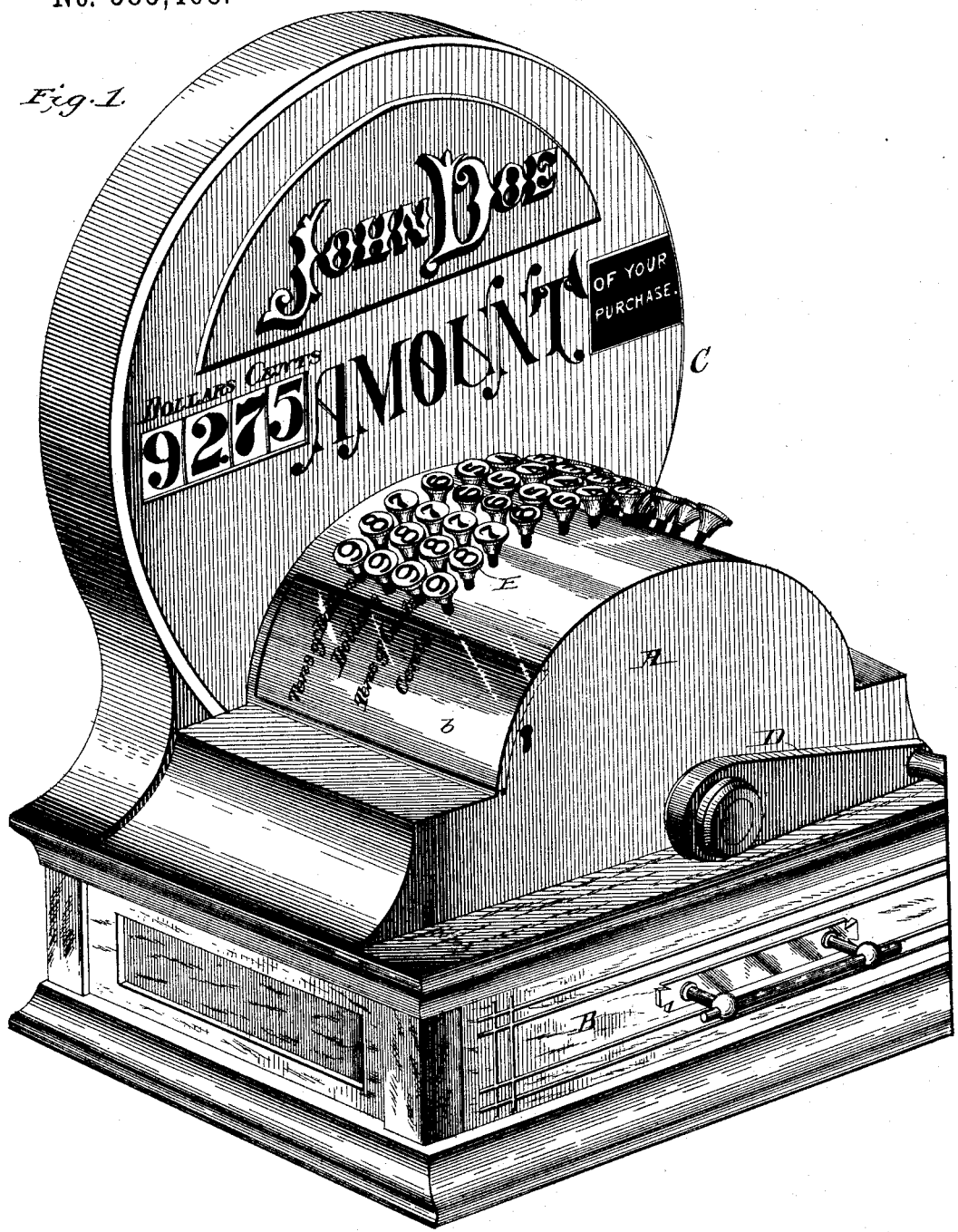

(No Model.)
12 Sheets—Sheet 2.

F. L. FULLER.
CASH REGISTER.

No. 585,468. Patented June 29, 1897.

(No Model.) F. L. FULLER. 12 Sheets—Sheet 3.
CASH REGISTER.

No. 585,468. Patented June 29, 1897.

Witnesses
F. R. Cornwall
Percy B. Hills.

Inventor,
Fred L. Fuller,
by Kenner & Goldsborough,
Attys (No Model.) 12 Sheets—Sheet 4.

F. L. FULLER.
CASH REGISTER.

No. 585,468. Patented June 29, 1897.

Witnesses
F. R. Cornwall
Percy B. Hills

Inventor,
Fred'k L. Fuller,
by Kenner & Goldsborough,
Attys (No Model.) 12 Sheets—Sheet 5.

F. L. FULLER.
CASH REGISTER.

No. 585,468. Patented June 29, 1897.

Witnesses
F. R. Cornwall
Percy B. Hills

Inventor,
Fred'k L. Fuller,
by Punnie & Goldsborough
Atty's (No Model.) 12 Sheets—Sheet 6.

F. L. FULLER.
CASH REGISTER.

No. 585,468. Patented June 29, 1897.

Witnesses:
F. R. Cornwall
Lucy B. Hills

Inventor:
Fred'k L. Fuller,
by Kenner & Goldsborough,
Attys.

(No Model.)  12 Sheets—Sheet 8.

F. L. FULLER.
CASH REGISTER.

No. 585,468. Patented June 29, 1897.

Witnesses
A. M. Parkins
Ciey B. Hills

Inventor,
Fred L. Fuller,
by Bennee & Goldsborough
Attys

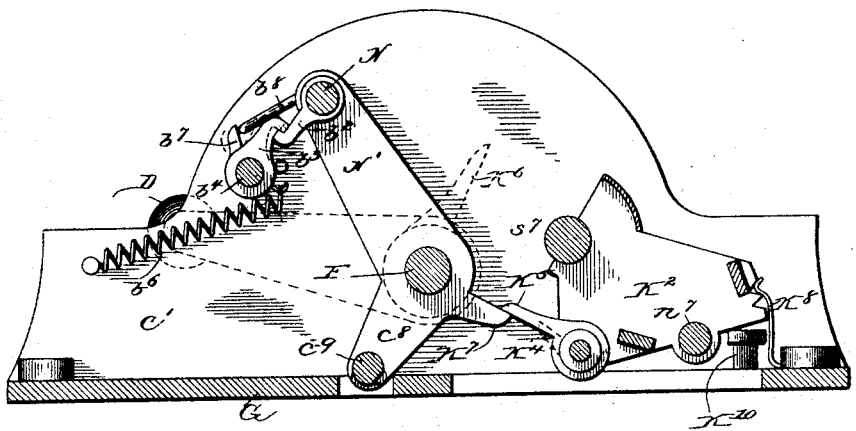

(No Model.) 12 Sheets—Sheet 10.
F. L. FULLER.
CASH REGISTER.
No. 585,468. Patented June 29, 1897.
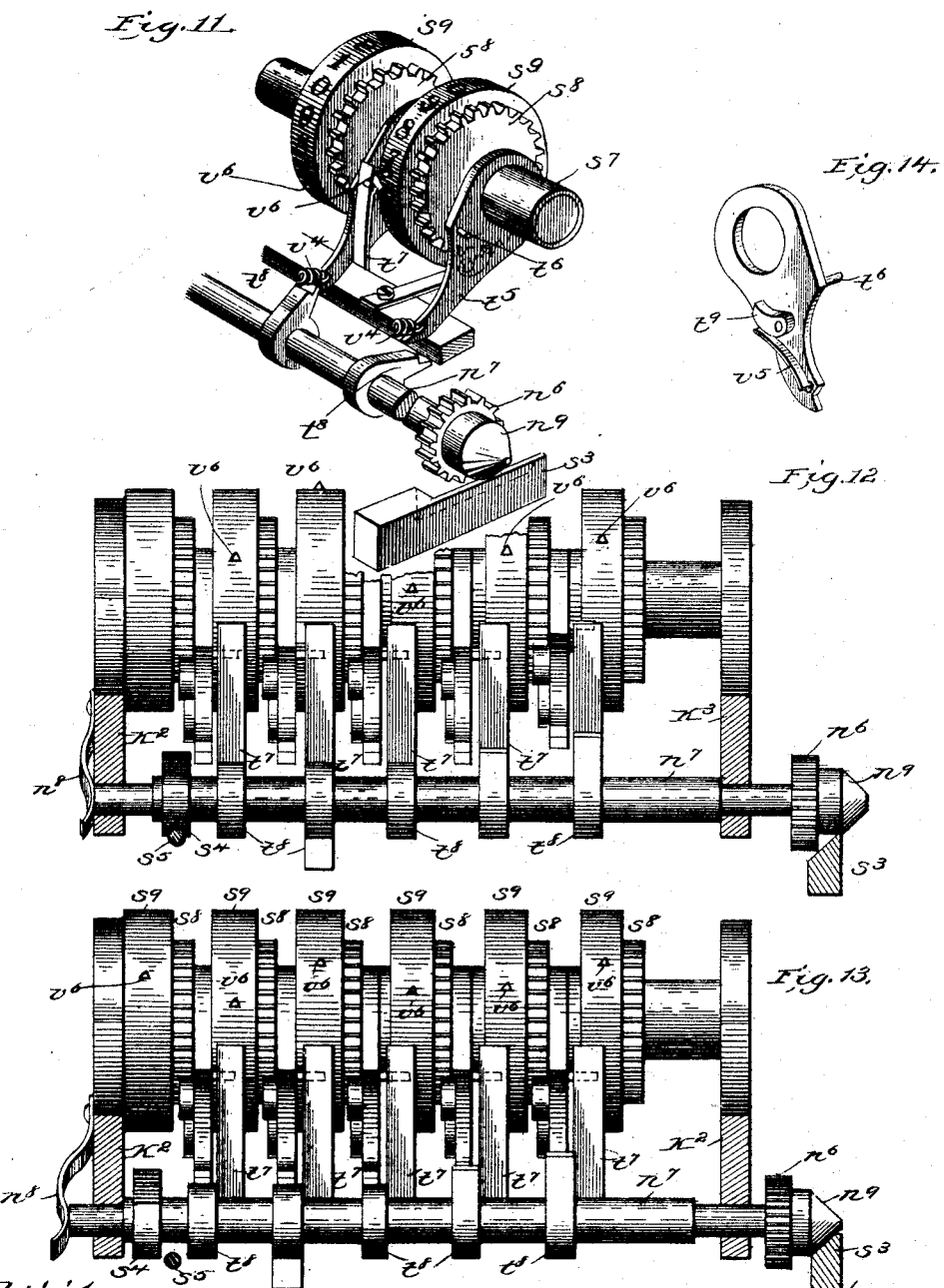

(No Model.)  12 Sheets—Sheet 11.
F. L. FULLER.
CASH REGISTER.
No. 585,468.  Patented June 29, 1897.
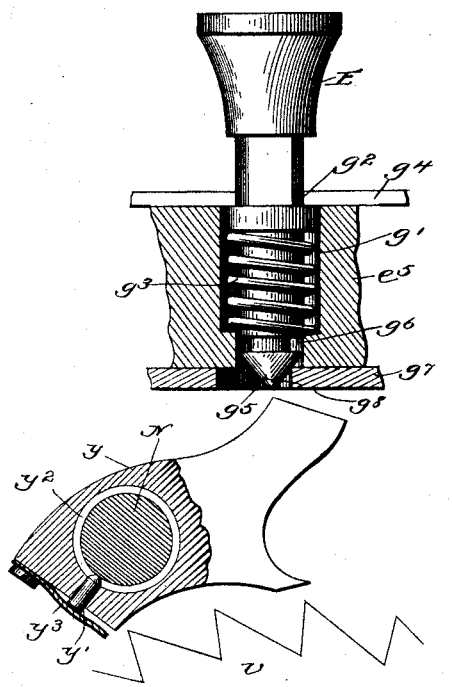
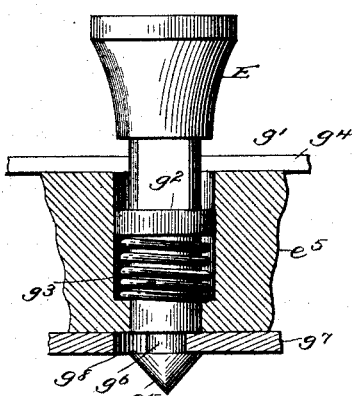
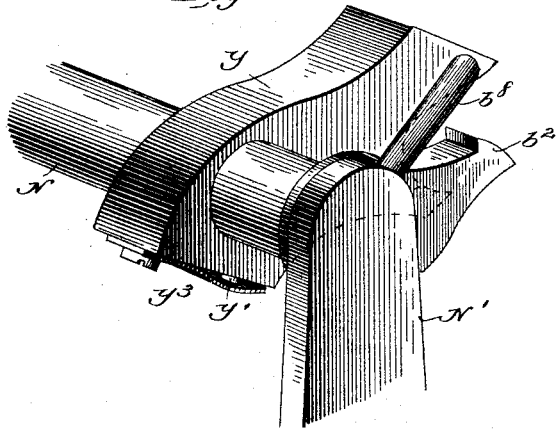
Witnesses
F. P. Cornwall
Percy B. Hills.
Inventor,
Fred L. Fuller,
by Kenner & Goldsborough,
Attys (No Model.)

F. L. FULLER.
CASH REGISTER.

No. 585,468. Patented June 29, 1897.

Witnesses:
F. R. Cornwall
Percy B. Hills

Inventor:
Fred'k L. Fuller,
by Pennie & Goldsborough
Attys.

UNITED STATES PATENT OFFICE.

FREDERICK L. FULLER, OF TRENTON, NEW JERSEY.

CASH-REGISTER.

SPECIFICATION forming part of Letters Patent No. 585,468, dated June 29, 1897.

Application filed October 4, 1892. Serial No. 447,781. (No model.)

*To all whom it may concern:*

Be it known that I, FREDERICK L. FULLER, a citizen of the United States, residing at Trenton, in the county of Mercer and State of New Jersey, have invented certain new and useful Improvements in Cash-Registers; and I do hereby declare the following to be a full, clear, and exact description of the invention, such as will enable others skilled in the art to which it appertains to make and use the same.

My invention relates to certain new and useful improvements in cash-registers, and has for its object to indicate and register individual sales and to totalize their gross amounts by means of mechanism compact and strong in construction and effective in operation, the required manipulations being of the simplest character and the arrangement of parts being such as to afford ample safeguards against accidental failure to give a correct indication, registration, or totalization, and against wilful or dishonest attempts to fraudulently alter any of such records.

The improvements constituting the present invention are shown herein and will be hereinafter described in connection with a cash-register of the class known as "crank-machines," in which the actuating mechanism consists of a hand-operated shaft provided with clutches for engaging segments which operate indicating-dials, as distinguished from that class of machines commonly termed "key-machines," in which the actuating mechanism consists of a series of keys which, through suitable rack-bars or other similar devices, engage and actuate the indicating devices. It will be understood, however, that many features of the present invention, although shown in connection with such a crank-machine, are equally applicable to key-machines.

In carrying out my invention I have provided a number of concentric disks adapted to give the same indication through openings in the front and rear of the casing, so as to adapt the register to use as a counter or bar machine, as will be readily understood. The openings remain closed in each instance until the operating-lever of the machine at the limit of the forward throw withdraws the shutters and exposes the indicating-figures of the dial behind them, at which period the parts are locked in such position that the return movement of the lever insures the accurate addition of the amount indicated to that already registered by the totalizer. The arrangement renders it impossible to alter any indication appearing through the dial-openings without first adding to the totalizer the complete amount of the indication altered. This provision against fraud is further supplemented by a construction which prevents any retrograde movement whatever of the operating-handle after having entered upon either a forward or a backward stroke until the full limit of the stroke is attained and the corresponding indication or totalization is made.

Each dial is provided upon its front face with a series of numerals "0" to "9," arranged radial to the center and at equal distances apart, and upon its rear face with a corresponding series of numerals in reverse order of notation. The innermost dial corresponds to the unit of the decimal-scale and the outlying dials successively to the tens, hundreds, thousands, &c., thereof, so that through either the front or rear opening of the casing the indication would read from left to right in the natural order of dollars and cents. Each dial is geared to a separate ratchet-sleeve concentric with each other upon the operating-shaft, but normally out of engagement with said shaft, and a bank of keys arranged in rows of nine corresponding to the several dials determines which of the ratchets are to be thrown into engagement with the shaft and at what periods in the revolution of the latter, thereby producing the appropriate indication on the dials.

The adding or totalizing mechanism preserves an accurate register of the aggregate amount of the sales, and is provided with carrying mechanism which is automatically set by the same operation which actuates the dials. The relationship of the totalizer to the indicating mechanism and the construction and operation of the auxiliary features of the machine will be described at length by reference to the drawings.

In the drawings, Figure 1 represents a perspective view of a cash-register embodying my improvements, the operating-lever being shown at the outer limit of its throw. Fig.

Figure 2:
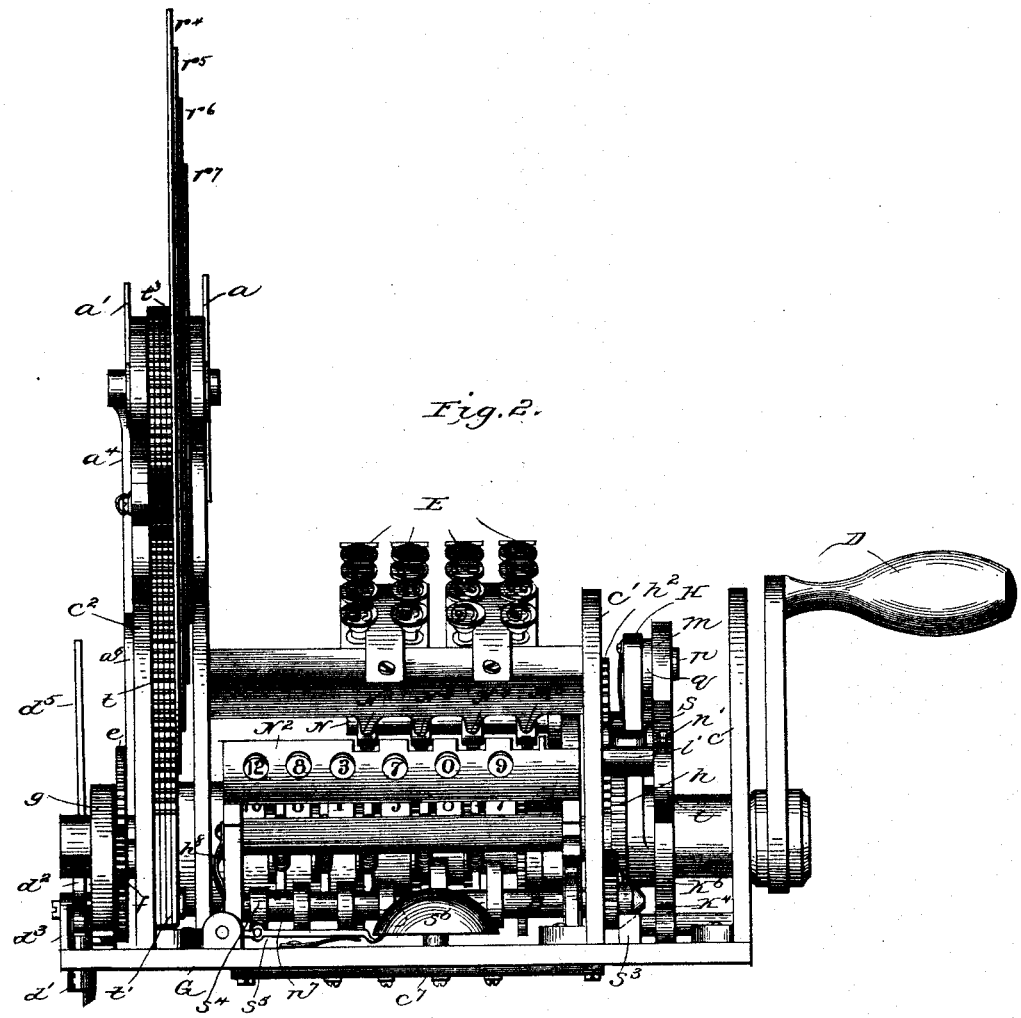
Figure 3:
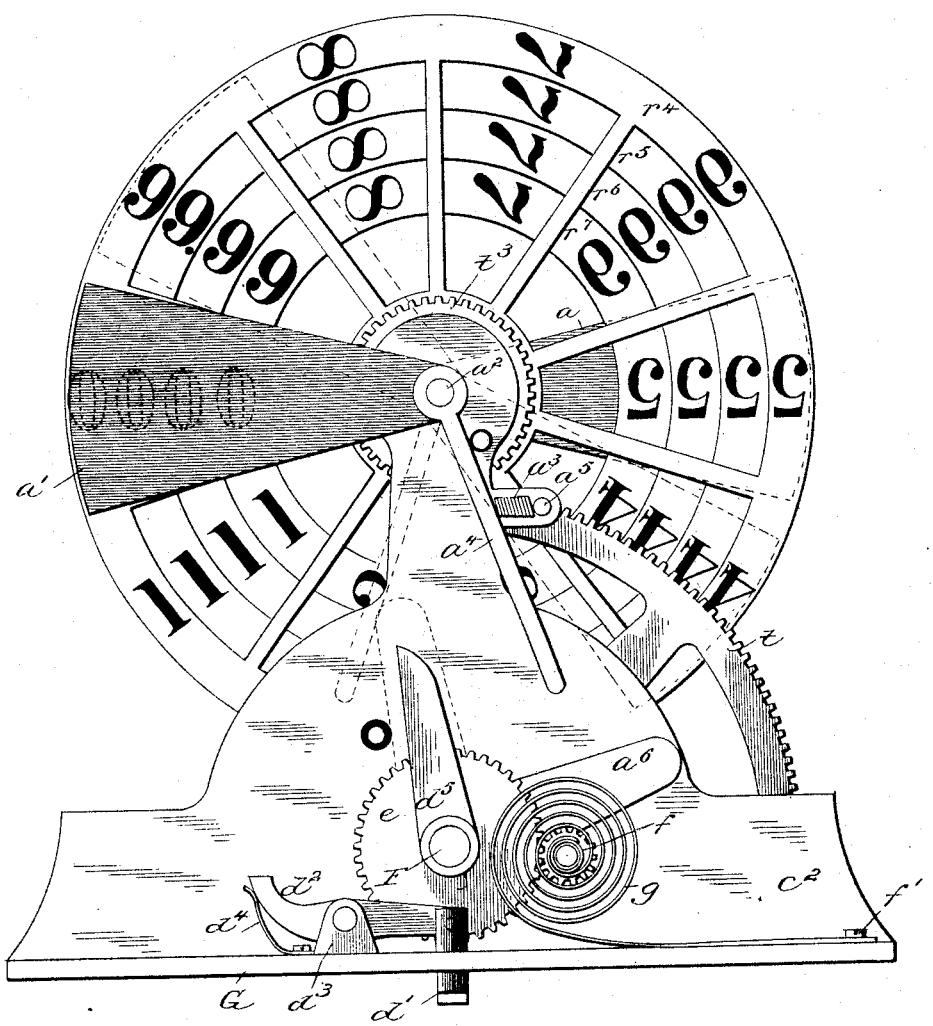
Figure 4:
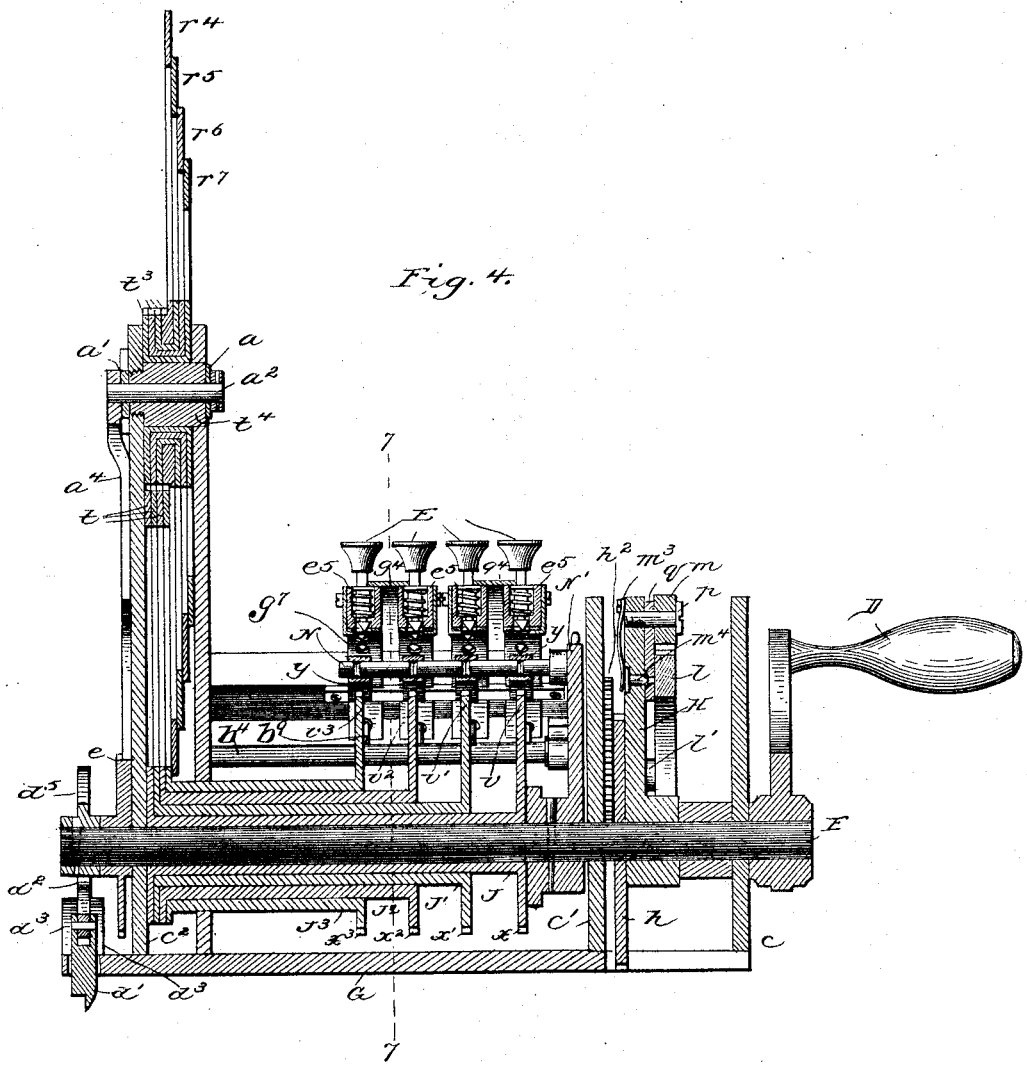
Figure 5:
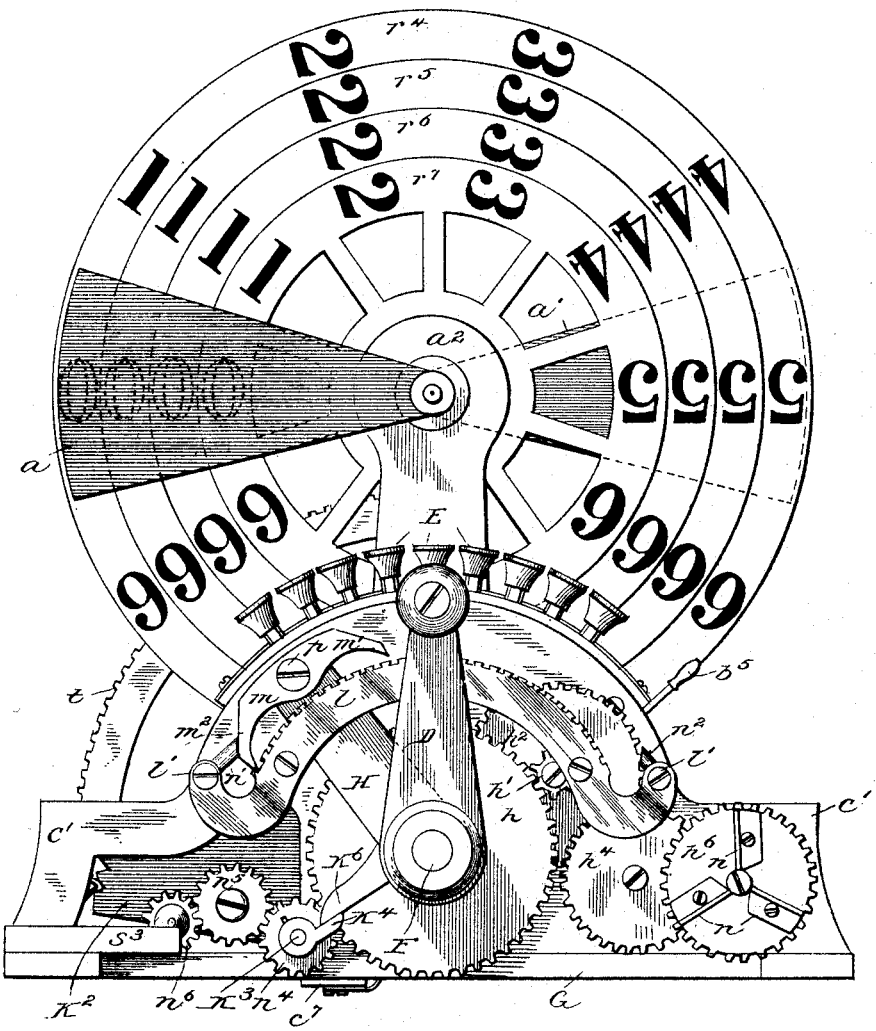
Figure 6:
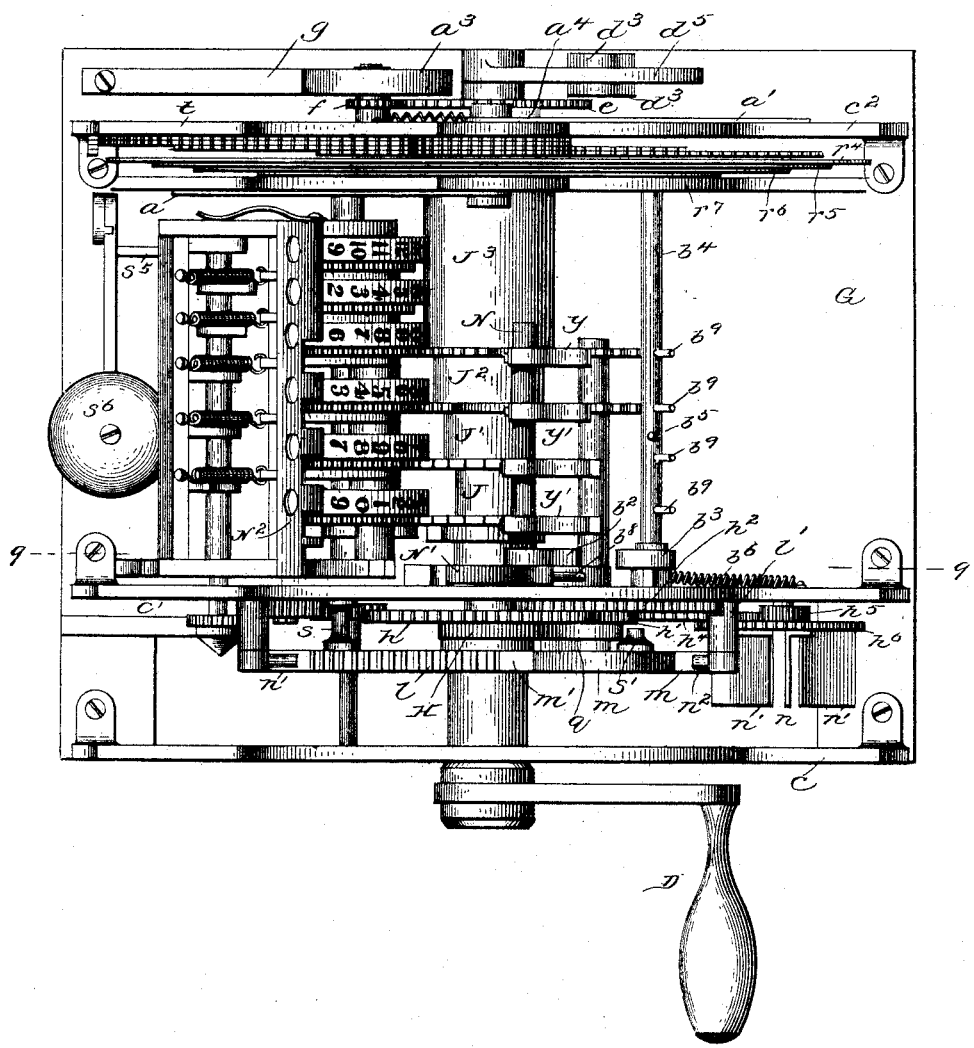
Figure 7:
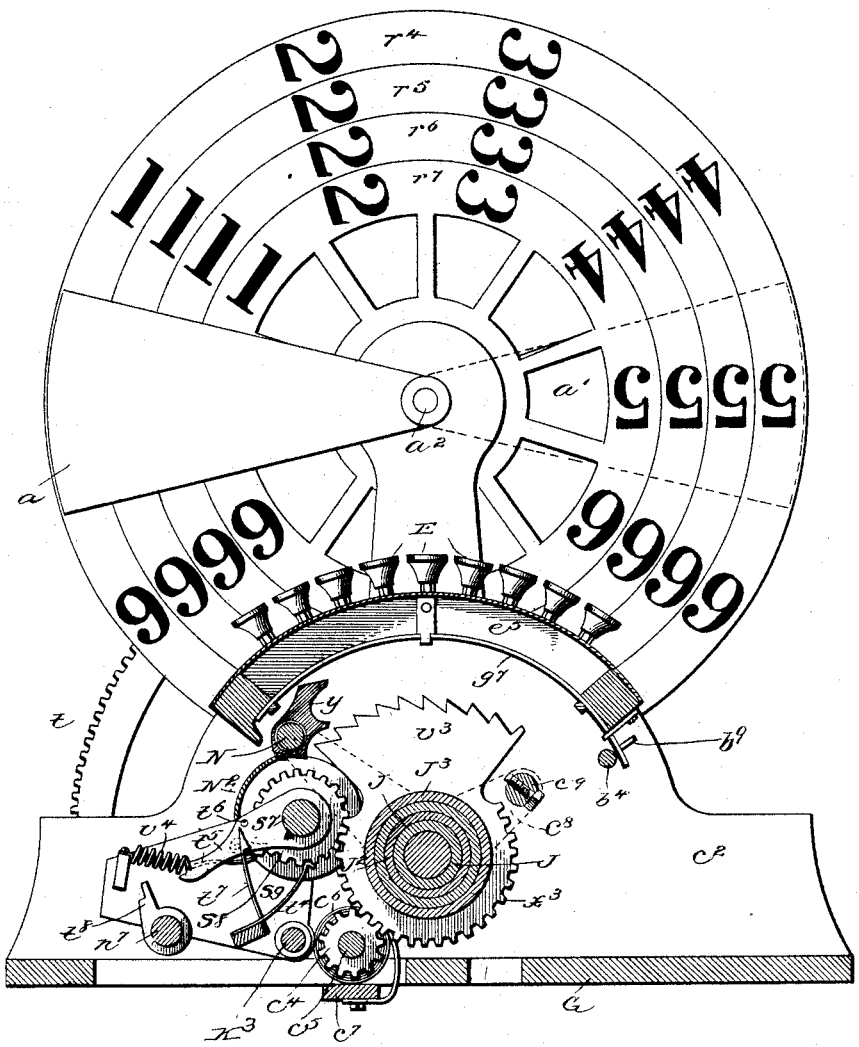
Figure 8:
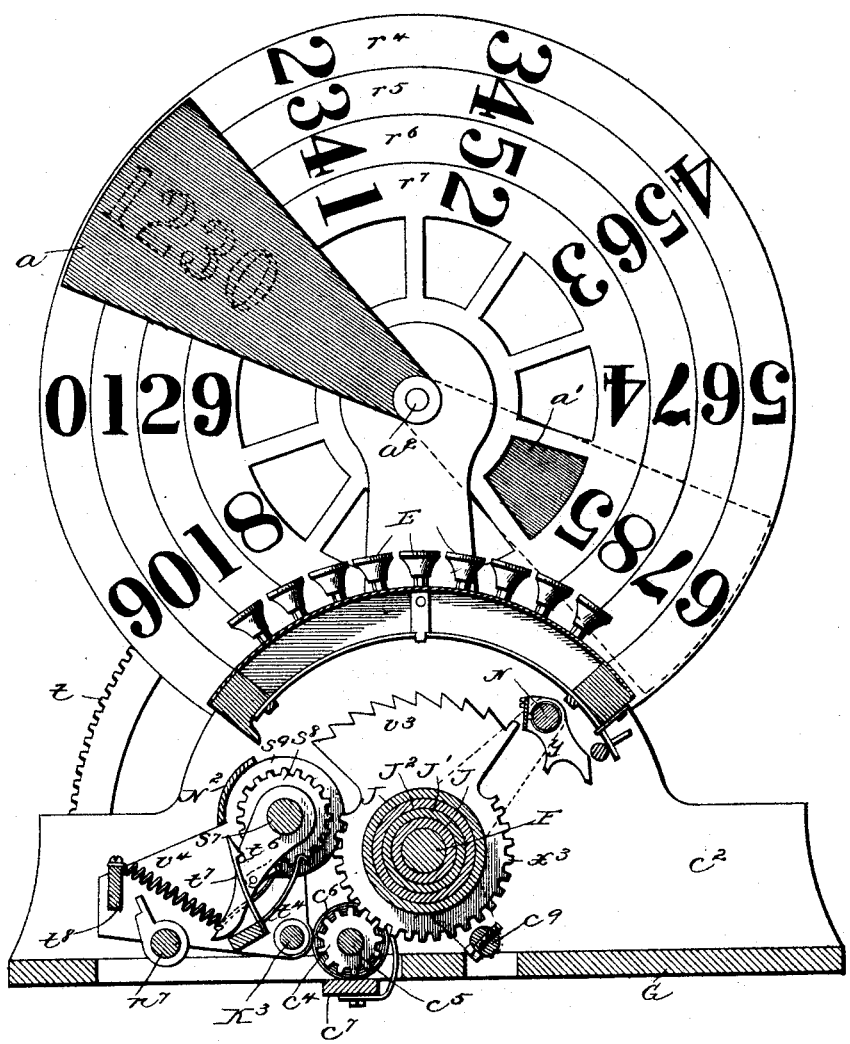
Figure 18:
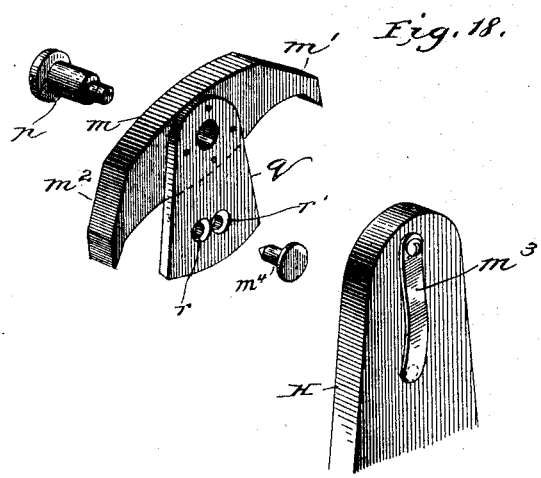
Figure 19:
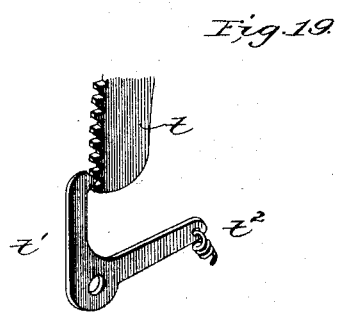

2 represents a side elevation with the inclosing casing and the cash-drawer removed. Fig. 3 represents a rear elevation of the parts shown in Fig. 2 and indicates in dotted lines the mode of operation of the shutter. Fig. 4 represents a central vertical longitudinal section, the operating-lever being shown at a point midway of its throw. Fig. 5 represents a front elevation with the proximate support or bearing-plate for the actuating-shaft removed and with the operating-lever at its initial position. Fig. 6 represents a top plan view of the parts with the keys removed and just before the operating-lever has completed its forward throw. Fig. 7 represents a cross-sectional elevation taken on a plane indicated by the line 7 7 of Fig. 4, the parts being shown as they appear when the operating-lever is in the initial or normal position. Fig. 8 represents a like view with the parts in the position they assume at the completion of the indication of a sale. Fig. 9 represents a section on the line 9 9 of Fig. 6 with the parts shown in the position they assume at the time the indication is being completed. Fig. 10 represents a like view of the parts in their initial or normal position. Fig. 11 represents in perspective and on a large scale a detail view of a part of the totalizing mechanism. Figs. 12 and 13 represent plan views of the same in their two adjustments respectively. Fig. 14 represents a perspective view of one of the carrying-arms of the totalizing mechanism. Figs. 15 and 16 represent, also on a large scale, sectional elevations of the keys and illustrate the manner in which the actuating-pawls may be thrown into gear with the sleeve-ratchets that are geared to the dials. Fig. 17 represents in perspective one of said pawls and the arm carrying the same, together with the adjunctive devices for releasing the keys and catching and holding the arm at the termination of the indicating stroke. Fig. 18 represents in perspective a portion of the arm carrying the double-acting back-stop pawl and illustrates the pawl itself and its adjuncts disassembled from each other. Fig. 19 represents in perspective the lower part of one of the toothed segments which actuate the dials, together with the spring-catch for preventing said segment from being moved by friction during the operation of its neighbor.

Similar letters of reference indicate similar parts throughout the several views.

Referring to Fig. 1 of the drawings, A indicates the inclosing main casing of the cash-register; B, the customary cash-drawer; C, the dial-casing, having front and rear display-openings adapted to be normally closed by the shutters $a$ $a'$; D, the operating-handle or lever, which constitutes the actuator, and E the bank of controlling-keys, disposed or arranged in series to represent cents, tens of cents, dollars, and tens of dollars, or the like. A lock-slide $b$ in the main casing permits inspection of the figures of the totalizer when desired.

The operating-handle D is fixed upon the main actuating-shaft F, which shaft is mounted to rock in bearings formed by the rigid standards $c$ $c'$ $c^2$, as best shown in Fig. 4, mounted upon the base-plate G, which is located immediately above the cash-drawer. The cash-drawer is locked within the casing by the drop-catch $d'$, having a pin connection with a lever $d^2$, which is pivoted between the lugs $d^3$. (See Figs. 3 and 4.) A spring $d^4$, acting against the free end of the lever $d^2$, normally holds the catch $d'$ in its lowest position, so as to engage with the cash-drawer and prevent it from being opened. Upon the shaft F is mounted an arm $d^5$, which is adapted to depress the free end of the lever $d^2$ and to raise the catch $d'$, and thereby release the cash-drawer when the operating-lever D has reached the forward limit of its throw and has been temporarily locked against return, as will be hereinafter more fully described.

The actuating-shaft F is provided with a gear $e$, meshing a pinion $f$, which is fixed upon an arbor bearing the coil-spring $g$, whose outer end is attached at $f'$ to the base G. (See Fig. 3.) When the operating-handle D is turned toward the right in recording a sale, the spring $g$ is wound thereby upon its arbor and exerts sufficient tension upon the shaft to subsequently return the handle to its original position. The velocity with which the shaft and handle are thus returned is modified by a retarding or cushioning device, preferably consisting of multiplying-gearing, as, for instance, the gears and pinions $h$, $h'$, $h^2$, $h^4$, $h^5$, and $h^6$, (see Fig. 5,) and a pinion on the same shaft as gear $h^4$ meshing with gear $h^2$ for actuating the retarding fan-blades $n$. The shock of the return of the shaft is thus largely compensated for, as is also that occasioned by its forward manual revolution in operating the machine.

In proximity to the shaft F and concentric therewith is arranged a rack $l$, (see Fig. 5,) preferably sustained by studs $l'$ from the standard $c'$. Coöperating with the rack is the double-acting back-stop pawl $m$, pivotally mounted in an arm H, fixed to the shaft F, having the forward projection $m'$ and the rearward projection $m^2$. At the ends of the rack are located the throw-pins $n'$ $n^2$, between which the arm H oscillates, said pins having inclined faces, as shown, adapted to coact with the inclined edges of the pawl to tilt the latter upon its pivot $p$ when the inclines come in contact with each other.

As illustrated more fully in Fig. 18, the pivot P has a smooth cylindrical shank passing through the pawl $m$ and through the plate $q$, rigidly connected with or integral with the pawl. The inner end of the pivot-pin is threaded and is screwed into the arm H, which is fixed upon the shaft F. The arm H carries a leaf-spring $m^3$, bearing at its free end against the catch-pin $m^4$ and tending to force the latter toward the plate $q$ with moderate pressure. The conical forward end of the catch-pin is adapted to partially enter one or the other of the two openings $r\ r'$ of the plate $q$. When the pawl $m$ is tilted into the position shown in Fig. 5, the conical end of the catch-pin enters the opening $r'$, and therefore holds the pawl in that position as it travels forward over the rack $l$, whereby the projection $m^2$ serves as a back-stop to prevent retrograde motion of the shaft F until the handle D has reached the forward limit of its throw, whereupon the pawl $m$ is tilted in the opposite direction by reason of the inclined edge of the projection $m'$ coming in contact with the opposing inclined face of the throw-pin $n^2$. The catch-pin is thereby forced back out of the opening $r'$ against the pressure of the spring $m^3$ and again comes forward to enter the opening $r$, thus locking the pawl in its new position, so that the projection $m'$ will act as a back-stop during the return movement of the shaft, at the end of which the throw-pin $n'$ once more tilts the pawl into its first-described position. The pawl is thus made double-acting, so that the operating-handle must in every instance be carried to the extreme limit of the forward or backward throw, as the case may be, upon which it has entered before it can be moved in the reverse direction. The projections $s$ and $s'$ (see Fig. 6) serve as limit-stops for the arm H, and consequently for the shaft F, upon which it is fixed.

Upon the shaft F (see Figs. 4, 6, 7, and 8) are mounted a number of loose independent concentric sleeves J J' J$^2$ J$^3$, adapted to turn freely upon each other and upon the shaft. At their rear ends these sleeves are each provided with a separate gear-quadrant $t$, Fig. 4, set face to face. In order to prevent any of these quadrants being moved by frictional contact with its neighbor during the movement of the latter, each one is normally held against movement by one of a number of spring-catches $t'$, (see Fig. 2,) having an angular end, as shown more fully in Fig. 19, the spring $t^2$ having sufficient tension to hold the catch in place in resistance to the power exerted by any frictional contact of the kind referred to, but readily yielding to the far-greater power imparted direct to each sleeve from its own appropriate actuating devices, as hereinafter more fully described.

Each of the quadrants (see Fig. 4) meshes with a corresponding gear $t^3$ upon a series of concentric sleeves, mounted to turn loosely upon each other and upon the fixed bearing-pin $t^4$, the several sleeves bearing at their inner ends the dials $r^4\ r^5\ r^6\ r^7$. The dials are set preferably with overlapping edges, and are each provided upon both front and rear faces (see Figs. 3 and 5) with a series of numbers from "0" to "9," symmetrically and equally spaced thereon upon lines radial from the center. When the operating handle or lever D is in the upright position, like numbers on the overlapping dials are in alinement with each other, both for the front and rear faces thereof, and the front and rear openings in the cash-register casing are covered, respectively, by the shutters $a\ a'$. The register, therefore, at such time gives no cash indication.

The forward ends of the sleeves J J' J$^2$ J$^3$, Figs. 4 and 7, are respectively provided with the ratchets $v\ v'\ v^2\ v^3$ and the segmental gears $x\ x'\ x^2\ x^3$. Beyond the periphery of the ratchets extends a cross-rod N, attached to an arm N', which is rigidly connected to the shaft F. At points above the several ratchets this cross-rod bears a corresponding number of pawls $y$, adapted to be tilted back, so as to be out of operative relationship with the ratchets, as indicated in Figs. 7 and 15, or to be tilted forward, so as to engage therewith, as indicated in Fig. 16, said pawls $y$ constituting clutches for connecting the actuating-shaft F with the respective segmental gears $x\ x'\ x^2\ x^3$ upon the depression of a key or keys E in the respective banks. Longitudinal movement of the pawls upon the cross-rod is prevented by the pins $y'$ engaging with the annular grooves $y^2$, and held inwardly with moderate pressure by the springs $y^3$, which have sufficient tension to maintain the pawls in their backwardly-tilted position, but not sufficient to prevent them from being tilted forward by a depressed key, nor to prevent them from being subsequently tilted back to their original positions by the back-stop N$^3$, as I am about to describe.

Above each pawl $y$ and its ratchet extends an arched or bow-shaped support $e^5$, (see Figs. 4, 7, and 8,) having recesses $g'$, within which are arranged the shanks of the keys E, of which there are four series, corresponding to cents, tens of cents, dollars, and tens of dollars, each series being numbered consecutively from "9" to "1," as shown in Fig. 1. The key-shanks are provided with fixed collars $g^2$, (see Figs. 15 and 16,) against which bear the coiled springs $g^3$, and which tend to press the collars against the retaining-bands $g^4$, and thereby to hold the keys in their upper or retracted position. At their lower ends the shanks are provided with the conical heads $g^5$ and locking-grooves $g^6$, and beneath the conical heads of the keys of each series extend locking-plates $g^7$, having apertures or the like $g^8$ for receiving the shanks of the keys, said locking-plates being also provided with apertures at their ends, into which enter pins $b^9$, fast upon a rock-shaft $b^4$, extending transversely of the machine. (See Figs. 4 and 6.) A spring $b^6$, connected to the machine-frame and to the rock-shaft $b^4$, normally holds the latter and through it the locking-plates in such manner that the apertures $g^8$ but partly coincide with the recesses $g'$, the arrangement being such, however, that on forcing a key downward its conical head will force the plate $g^7$ forward against the tension of the spring $b^6$ until the head shall have passed through the opening $g^8$, whereupon the plate will immediately spring backward and lock the key in the lowered position. This operation, which is effected by the operator pressing down the key by hand, is fully shown in Figs. 15 and 16, which also makes plain the fact that when a key is thus pressed down and locked in position its conical head is in the path of movement of the forward end of the corresponding pawl $y$, so that when the operating-lever D is thrown forward, carrying with it the arm N' and cross-rod N, every depressed key will cause the corresponding pawl $y$ to be tilted forward and thereby thrown into engagement with its appropriate ratchet, so as to rotate the corresponding sleeves and impart a like movement to the particular dial-plates to which said sleeves are geared. Consequently the dials would give an indication through the sight-openings of the casing at front and rear of the machine corresponding in dollars and cents to the keys depressed; but this indication is concealed by the shutters $a$ $a'$, which cover the said openings and which are not completely withdrawn until the operating-handle has reached the limit of its forward throw, whereupon the indication appears through the openings. To thus withdraw the shutters, (see Fig. 3,) they are fixed upon a rock-shaft $a^2$, so as to turn therewith, and are normally held over the openings by means of a spring $a^3$, attached to an arm $a^4$ of the rock-shaft and connecting said arm with a fixed part of the machine and against a backstop or abutment, as $a^5$. An arm $a^6$, fixed upon the shaft F, acts against the arm $a^4$ during the forward throw of the handle D to withdraw the shutters, as indicated clearly in dotted lines in Fig. 3 of the drawings. On the return movement of the handle the retractile force of the spring $a^3$ insures a prompt return of the shutters to close the openings.

As soon as the shutters are withdrawn from the openings and the indication completed the handle F is locked at a point slightly preceding the limit of its forward throw. This is effected (see Figs. 9 and 10) by means of a hook or catch $b^2$ upon the cross-rod N engaging with a similar hook or catch $b^3$ upon rock-shaft $b^4$. This rock-shaft is provided with an operating-handle $b^5$, (see Fig. 5,) projecting through the register-casing, and is held in its forward position by the spring $b^6$, connected to the rock-shaft and the frame of the machine, as before described, the forward movement of the handle being limited by the casing with which it engages. The spring $b^6$ is connected to a collar upon the rock-shaft, which collar has a projection $b^7$ in the path of movement of a pin $b^8$ upon the cross-rod N, and said projection is struck by the pin just before the engagement of the catches $b^2$ and $b^3$, thereby rocking the shaft $b^4$ slightly backward and permitting said engagement. It will be noted, moreover, that the rock-shaft $b^4$, being connected, as before described, through studs $b^9$ with the locking-plates $g^7$, upon a slight backward rocking of the shaft $b^4$ the plates $g^7$ will also be moved and thus release all of the depressed keys, and the springs $g^3$ of which will then restore them to their normal positions.

The indication having thus been given through the front and rear openings of the casing, the keys having been released, and the double-acting pawl having been shifted so as to permit the retrograde movement of the lever D, the operator can bring about the return of the parts to their normal positions by disengaging the hooks $b^2$ $b^3$. This disengagement takes place by the act of depressing the first one of the keys actuated for indicating a subsequent sale. Thus the act of depressing any one of the keys causes said key to force its corresponding slide-plate $g^7$ forward, thereby rocking the shaft $b^4$ through the intermediacy of one of the pins $b^9$, and consequently disengaging the hooks $b^2$ $b^3$, whereupon the spring $b^6$ acts to return all of the parts to their original positions except the key whose depression has occasioned the disengagement of the hooks $b^2$ $b^3$. On this return movement the ratcheted sleeves J J' $J^2$ $J^3$ are retracted by means of the pinions $c^4$, (see Figs. 7 and 8,) mounted to revolve freely upon the shaft $c^5$ and provided with the coiled springs $c^6$, attached at one end to the several pinions $c^5$ and at the other end to some convenient fixed part of the machine, as, for instance, the cross-bar $c^7$. The forward movement of the sleeves puts a tension upon the springs $c^6$, which tension is thus utilized to effect the return of the sleeves. An arm $c^8$, attached to the shaft F, carries a cross-bar $c^9$, which is an additional safeguard to insure the return of the sleeves and to bring the edges of the segmental gears $x$ $x'$ $x^2$ $x^3$ into alinement.

It may sometimes happen that the operator through carelessness or inattention depresses a key or keys in the wrong bank or banks. The error thus committed may be corrected should he discover his mistake before further operating the machine. Thus by rocking the shaft $b^4$ by means of the handle $b^5$ all of the keys are released and returned to their original positions, thereby correcting the error and permitting the operator to depress the right key or keys, so as not to make a false indication or registration. Again, assuming that a past sale is indicated and it is desired to open the cash-drawer for the purpose of making change only and not to indicate or register any new sum, the handle $b^5$ is operated in like manner to rock the shaft $b^4$ and disengage the hooks $b^2$ $b^3$, thereby returning the lever $d$ and the dials to their initial postion, whereupon by a forward throw of the lever D the cash-drawer is opened. As the parts thus return to their normal position the carrying mechanism will be actuated so as to do the carrying necessary after the last preceding sale.

In Fig. 9 I have indicated in dotted lines the extent of backward movement imparted to the lock $b^7$ and catch $b^3$ by the forward throw of the lever D. It will be observed that the engagement of the hooks $b^2$ $b^3$ does not take place until the arm N' and the lever D have retracted slightly from the extreme limit of their forward throw. This is an important feature of the machine, for the reason that it permits the rock-shaft $b^4$ to return correspondingly. If it were not thus permitted to return, the several apertures $g^8$ in the slides $g^7$, through which the shanks of the operating-keys pass, would register with the conical heads $g^5$ on the shanks of the keys, so that it would be impossible to depress another key so as to be caught by its slide and held in a depressed position, but by allowing the shaft to rock slightly the plates, after being moved to release the keys, spring back to their normal positions, so that any key can be depressed and held.

There are additional reasons for permitting the slight retrograde movement referred to. Thus to effect an indication and registration of nine it is necessary to move the corresponding dial forward nine steps, during which movement the registering device, being in gear with the actuating mechanism, is revolved the same distance. As soon as the nine steps are passed the lug $K^7$ on the arm N' (see Fig. 9) impinges the arm $K^5$, connected with the tilting frame $K^2$, and throws the registering mechanism out of gear with the actuating mechanism, so that nothing is added after nine, although the actuating mechanism carries the dial one additional half-space, returning it, however, by the same amount when the slight retrograde movement referred to is completed. Again, the slight retrograde movement referred to releases the lever $a^4$ and rock-shaft $a^2$ from the pressure of the arm $a^6$ on the actuating-shaft F. This is necessary in order that the cash-drawer may be closed and locked before the machine is operated to indicate and register again.

The totalizing mechanism (see Figs. 6 to 13) is mounted within a frame $K^2$, which is adapted to tilt or rock with a rock-shaft $K^3$, journaled in bearings in the main framework of the machine. Upon this rock-shaft $K^3$ are also affixed the arms $K^4$ $K^5$, coöperating, respectively, with similar fixed arms $K^6$ $K^7$ upon the shaft F, so that when the lever D is in the upright position, as shown in Fig. 10, the frame $K^2$ will be tilted forward toward the shaft F, and when the lever D is at the limit of its forward throw the frame $K^2$ will be tilted backward with respect to said shaft F, as shown in Figs. 8 and 9, a yielding spring-catch $K^8$, engaging with the ratcheted rear edge of the frame $K^2$, serving to temporarily maintain the one adjustment until the other is established. A rubber buffer $K^{10}$ serves as a back-stop to the tilting frame.

An idle-pinion $n^4$, (see Fig. 5,) mounted to revolve freely upon the rock-shaft $K^3$, transmits motion through a second idle-pinion $n^5$, mounted upon the frame $K^2$, to the pinion $n^6$ and shaft $n^7$. The shaft has a limited longitudinal movement in its bearings within the frame $K^2$ and when the latter is tilted forward is forced forward by the spring $n^8$. When, however, the frame is being tilted backward, the outer conical end $n^9$ of the shaft, acting in conjunction with the fixed incline $s^3$, forces the shaft back against the spring-pressure. These movements of the shaft $n^7$ are illustrated to particular advantage in Figs. 11, 12, and 13.

It will be observed that the movement due to the spring $n^8$ is coincident with the termination of the forward stroke of the lever D. I utilize this fact by interposing in the path of a projection $s^4$ upon the shaft the actuating-levers $s^5$ of a bell $s^6$, so that the bell will be sounded at the same moment that the indication appears through the casing, thereby calling the attention of the purchaser thereto, as is desirable in machines of this general character.

Within the frame $K^2$ is mounted the shaft $s^7$, bearing a series of gears $s^8$, revoluble upon the shaft, and which mesh with the gears $x$ $x'$ $x^2$ $x^3$ of the sleeves J J' $J^2$ $J^3$ when the lever D is in its initial position, and continue to mesh therewith until the frame $K^2$ is tilted backward at the termination of the forward throw of the said lever. Consequently should any of the sleeves be rocked forward its corresponding gear $s^8$ would be rotated in unison therewith, and this same motion would be imparted to the particular registering number-wheel $s^9$ to which the said gear is attached. Spring-pawls $t^4$, Fig. 8, prevent movement of the gears $s^8$ when they are out of engagement with the sleeves.

I preferably provide each of the gears $s^8$ with twenty teeth, and upon the peripheries of each of the wheels $s^9$, except the one at the extreme left-hand end of the series, I print two series of numbers from "0" to "9," inclusive. (See Fig. 6.) Upon the last wheel I print one series of numbers from "1" to "20," inclusive.

Between each number-wheel $s^9$ and the proximate gear $s^8$ of its neighbor I journal loosely upon the shaft $s^7$ an arm $t^5$, Figs. 7, 8, 11, and 14, whose function is, when the first or units wheel has been revolved through a distance equal to ten of its gear-teeth, to register that fact upon the neighboring tens-wheel by causing the latter to advance one additional gear-tooth. To this end the arm $t^5$ is provided with a pin projection $t^6$, normally engaged by a spring-catch $t^7$ upon the frame $K^2$, which catch depresses the free end of the said arm, thereby holding said free end out of range of the corresponding tappet $t^8$ of the shaft $n^7$ against the tension exerted by the coil-spring $v^4$. Upon the opposite side of the arm $t^5$ an actuating-pawl $t^9$, held in place by a spring $v^5$, engages with the gear of the neighboring number-wheel. At diametrically opposite points of the periphery of the number-wheel project the studs $v^6$, Figs. 12 and 13, which are adapted on passing over the inclined free end of the spring-catch $t^7$ to thereby release the arm $t^5$, so as to permit the spring $v^4$ to elevate the free end of said arm, so as to bring it within range of the corresponding tappet. The upward movement of the arms $t^5$ is limited by the lower free edge of the plate $N^2$, which plate is provided with a series of apertures through which the total registered by the entire series of number-wheels can be read on the removal of the lock-slide in the casing.

The operation of the totalizer will be apparent. Thus, as indicated in Fig. 12, when the operating-lever D is in its initial position and during the period of its forward throw the shaft $n^7$ is in such position that its tappets are out of alinement with the carrying-arms, and therefore the tappets do not strike any of said arms during the forward or registering throw of the lever. As soon as the forward throw of the lever D is completed, however, the shaft $n^7$ is shifted longitudinally, as hereinbefore described, and as shown in Fig. 13, thereby bringing each tappet into the same vertical plane with its corresponding arm. Consequently on the return movement of the lever D, during which the shaft $n^7$ makes a complete revolution, its tappets strike the free ends of such of the carrying-arms as have been released by the studs of the number-wheels and, forcing said arms downward, cause their actuating-pawls to revolve the next number-wheel in the series the distance of one gear-tooth, thereby causing said next number-wheel to indicate through its sight-opening the next higher figure. In this manner the units-wheel at each revolution of its twenty teeth adds two to the tens-wheel, and in like manner the tens-wheel at each revolution adds two to the hundreds-wheel, and so on for the series, so that the totalizer, when the lever D is in its initial or upright position, shows the exact aggregate amount registered for the sales made up to the time of inspection.

In the foregoing description of parts I have specified the various elements which seem best calculated to carry out the purposes of the invention; but I do not wish to be understood as limiting myself to the exact construction set forth and shown, as in many instances I contemplate the employment of such mechanical equivalents for the particular features shown as fairly fall within the scope of my invention.

Having thus described my invention, what I claim is—

1. The combination with indicating mechanism, of an oscillating actuator therefor, a clutch carried by the actuator, a series of keys each adapted when depressed to throw the clutch into engagement with the indicating mechanism, means for locking the indicating mechanism against return upon the termination of the indicating movement, and means for releasing the indicating mechanism, substantially as described.

2. The combination with indicating mechanism, of an oscillating actuator therefor, a clutch carried by the actuator, a series of keys each adapted when depressed to throw the clutch into engagement with the indicating mechanism, means for locking the indicating mechanism against return upon the termination of the indicating movement, means for releasing the indicating mechanism, and spring mechanism for returning it to zero position, substantially as described.

3. The combination with indicating mechanism, of an oscillating actuator therefor, a clutch carried by the actuator, a series of keys each adapted when depressed to throw the clutch into engagement with the indicating mechanism, means for locking the indicating mechanism against return upon the termination of the indicating movement, and means controlled by the undepressed keys for releasing the indicating mechanism, substantially as described.

4. The combination with indicating mechanism, of an oscillating actuator therefor, a clutch carried by the actuator, a series of keys each adapted when depressed to throw the clutch into engagement with the indicating mechanism, means for locking the indicating mechanism against return upon the termination of the indicating movement, means controlled by the undepressed keys for releasing the indicating mechanism, and spring mechanism for returning it to zero position, substantially as described.

5. The combination with indicating mechanism, of an oscillating actuator therefor, a clutch carried by the actuator, a series of keys each adapted when depressed to throw the clutch into engagement with the indicating mechanism, means for locking the indicating mechanism and actuator against return upon the termination of the indicating movement, and means for releasing the indicating mechanism and actuator, substantially as described.

6. The combination with indicating mechanism, of an oscillating actuator therefor, a clutch carried by the actuator, a series of keys each adapted when depressed to throw the clutch into engagement with the indicating mechanism, means for locking the indicating mechanism and actuator against return upon the termination of the indicating movement, and means controlled by the undepressed keys for releasing the indicating mechanism and actuator, substantially as described.

7. The combination with indicating mechanism, of an actuator therefor, a clutch carried by the actuator, a series of keys each adapted when depressed to throw the clutch into engagement with the indicating mechanism, means for locking the indicating mechanism in indicating position and means controlled by the undepressed keys for releasing it, substantially as described.

8. The combination with indicating mechanism, of an actuator therefor, a clutch carried by the actuator, a series of keys adapted when depressed to throw the clutch into engagement with the indicating mechanism, means for locking the indicating mechanism in indicating position, a locking-slide for locking the keys in depressed position, and connections between said slide and locking means, substantially as described.

9. The combination with indicating mechanism, of an actuator therefor, a clutch carried by the actuator, a series of keys each adapted when depressed to throw the clutch into engagement with the indicating mechanism, a locking-slide for retaining the keys in depressed position, and means independent of the actuator and the keys for operating said slide to release the keys, substantially as described.

10. The combination with a series of indicating devices, of an actuator therefor, a corresponding series of clutches carried by the actuator, a corresponding series of banks of keys adapted when depressed to move their respective clutches into engagement with the indicating mechanism, a locking-slide for each bank, connections between the several locking-slides, and means extending outside the machine-casing and independent of the keys and actuator for moving the slide to release the depressed keys, substantially as described.

11. The combination with a series of indicating devices, of an actuator therefor, a corresponding series of clutches carried by the actuator, a corresponding series of banks of keys adapted when depressed to move their respective clutches into engagement with the indicating mechanism, a locking-slide for each bank, a rock-shaft connected to each of said locking-slides and a lever extending outside the machine-casing for moving the slide to release the depressed keys, substantially as described.

12. A cash-register comprising an oscillating shaft provided with an operating-lever, a series of sleeves mounted upon said shaft, a series of indicating devices geared to the sleeves, pawls carried by the shaft for engaging the sleeves with the shaft during the forward movement of the shaft, keys for throwing the pawls into action, engaging devices for holding the parts at the limit of their forward throw, and a lever for releasing said devices to permit the return of the parts, substantially as described.

13. A cash-register comprising an oscillating shaft provided with an operating-lever, a series of sleeves mounted upon said shaft, a series of indicating devices geared to the sleeves, pawls carried by the shaft for engaging the sleeves with the shaft during the forward movement of the shaft, keys for throwing the pawls into action, engaging devices for holding the parts at the limit of their forward throw, a lever for releasing said devices to permit the return of the parts and springs for returning the parts to normal position, substantially as described.

14. In a cash-register, the combination with indicating devices, registering mechanism, comprising register-wheels and carrying devices therefor, and mechanism for actuating the indicating devices and for successively actuating the two members of the registering mechanism, of means, dependent for operation upon the actuating mechanism, for moving one of said two mechanisms toward the other into position to effect the engagement with the actuating mechanism of one member of the registering mechanism after the disengagement therefrom of the other member thereof, substantially as described.

15. In a cash-register, the combination with indicating devices, registering mechanism, comprising register-wheels and carrying devices therefor, and mechanism for actuating the indicating devices and for successively actuating the two members of the registering mechanism, of means, dependent for operation upon the actuating mechanism, for moving one of said two mechanisms away from the other into position to effect the disengagement from the actuating mechanism of one member of the registering mechanism prior to the engagement therewith of the other member thereof, substantially as described.

16. In a cash-register, the combination with indicating devices, registering mechanism, comprising register-wheels and carrying devices therefor, and mechanism for actuating the indicating devices and for successively actuating the two members of the registering mechanism, of means, dependent for operation upon the actuating mechanism, for moving one of said two mechanisms toward and from the other into position to effect the engagement with the actuating mechanism of one member of the registering mechanism after the disengagement therefrom of the other member, and the disengagement therefrom of the said first member before the reengagement of the latter member, substantially as described.

17. In a cash-register, the combination with indicating devices, registering mechanism, comprising register-wheels and carrying devices therefor, and mechanism for actuating the indicating devices and for successively actuating the two members of the registering mechanism, of means, dependent for operation upon the actuating mechanism, for moving said two mechanisms, one toward the other, into position to effect the engagement with the actuating mechanism of one member, and the disengagement therefrom of the other member, of the registering mechanism, substantially as described.

18. In a cash-register, the combination with indicating devices, registering mechanism, comprising register-wheels and carrying devices therefor, and mechanism for actuating the indicating devices and for successively actuating the two members of the registering mechanism, of means, dependent for operation upon the actuating mechanism, for moving said two mechanisms, one toward and from the other, into position to effect the engagement with the actuating mechanism of one member, and the disengagement therefrom of the other member, of the registering mechanism, and vice versa, substantially as described.

19. In a cash-register, the combination with indicating devices, registering mechanism, comprising register-wheels and carrying devices therefor, and mechanism for actuating the indicating devices and for successively actuating the two members of the registering mechanism, of means, dependent for operation upon the actuating mechanism, for moving said two mechanisms, one toward and from the other, into position to effect the engagement with the actuating mechanism of the register-wheels and the disengagement therefrom of the carrying devices prior to the indicating movement, and vice versa upon the termination thereof, substantially as described.

20. In a cash-register, the combination with indicating devices, registering mechanism mounted to swing on its support and comprising register-wheels and carrying devices therefor, and mechanism for actuating the indicating devices and for successively actuating the two members of the registering mechanism, of means, dependent for operation upon the actuating mechanism, for swinging the registering mechanism toward the actuating mechanism into position to effect the engagement with the actuating mechanism of one member of the registering mechanism after the disengagement therefrom of the other member thereof, substantially as described.

21. In a cash-register, the combination with indicating devices, registering mechanism mounted to swing on its support and comprising register-wheels and carrying devices therefor, and mechanism for actuating the indicating devices and for successively actuating the two members of the registering mechanism, of means, dependent for operation upon the actuating mechanism, for swinging the registering mechanism toward and from the actuating mechanism into position to effect the engagement with the actuating mechanism of one member of the registering mechanism after the disengagement therefrom of the other member, and the disengagement therefrom of the first-named member before reëngagement of the latter member, substantially as described.

22. In a cash-register, the combination with indicating devices, registering mechanism mounted to swing on its support and comprising register-wheels and carrying devices therefor, and mechanism for actuating the indicating devices and for successively actuating the two members of the registering mechanism, said actuating mechanism including a movably-mounted member for actuating said carrying devices, of means, dependent for operation upon the actuating mechanism, for swinging said registering mechanism toward and from the actuating mechanism and the movable member of the latter from and toward the carrying devices into position to effect the engagement with the actuating mechanism of the register-wheels and the disengagement therefrom of the carrying devices and vice versa, substantially as described.

23. In a cash-register, the combination with indicating devices, registering mechanism mounted to swing on its support and comprising register-wheels and carrying devices therefor, and mechanism for actuating the indicating devices and for successively actuating the two members of the registering mechanism, said actuating mechanism including a movably-mounted member for actuating said carrying devices, of means, dependent for operation upon the actuating mechanism, for swinging the registering mechanism toward and from the actuating mechanism, and the movable member of the actuating mechanism from and toward the carrying devices, into position to effect the engagement with the actuating mechanism of the register-wheels and the disengagement therefrom of the carrying devices prior to the indicating movement, and vice versa upon the termination thereof, substantially as described.

24. In a cash-register, the combination with indicating devices, an actuator, clutches for connecting it with the indicating devices and registering mechanism comprising register-wheels and carrying devices therefor, said two registering members being adapted to be successively engaged and actuated by the actuating mechanism, of means, dependent for operation upon the actuating mechanism, for effecting the engagement with the actuator of one member of the registering mechanism and the disengagement therefrom of the other member, and vice versa, substantially as described.

25. In a cash-register, the combination with indicating devices, an actuator, clutches for connecting it with the indicating devices, and registering mechanism comprising register-wheels and carrying devices therefor, said two registering members being adapted to be successively engaged and actuated by the actuating mechanism, of means, dependent for operation upon the actuating mechanism, for effecting the engagement with the actuator of the register-wheels and the disengagement therefrom of the carrying devices prior to the indicating movement, and vice versa upon the termination thereof, substantially as described.

26. In a cash-register, the combination with indicating devices, an actuator therefor, clutches for connecting it with the indicating devices, and registering mechanism provided with a movable support and comprising register-wheels and carrying devices therefor, said two registering members being adapted to be successively engaged and actuated by the actuator, of means, dependent for operation upon the actuator, for moving said support into position to effect the engagement with the actuator of the register-wheels, after the disengagement therefrom of the carrying devices, and the disengagement therefrom of the register-wheels before the reëngagement of the carrying devices, substantially as described.

27. In a cash-register, the combination with indicating devices, an actuator therefor, clutches for connecting it with the indicating devices, and registering mechanism provided with a movable support and comprising register-wheels and carrying devices therefor, said two registering members being adapted to be successively engaged and actuated by the actuator, of means, dependent for operation upon the actuator, for moving said support into position to effect the engagement and disengagement of the register-wheels and actuator, and for effecting the disengagement of the carrying devices and actuator prior to and after the engagement and disengagement respectively of the register-wheels, substantially as described.

28. In a cash-register, the combination with indicating devices, an actuator therefor, clutches for connecting it with the indicating devices, and registering mechanism provided with a movable support and comprising register-wheels and carrying devices therefor, said two registering members being adapted to be successively engaged and actuated by the actuator, of means, dependent for operation upon the actuator, for moving said support into position to effect the engagement with the actuator of the register-wheels prior to the indicating movement, and their disengagement therefrom upon the termination thereof, substantially as described.

29. In a cash-register, the combination with indicating devices, an actuator therefor, clutches for connecting it with the indicating devices, and registering mechanism provided with a movable support and comprising register-wheels and carrying devices therefor, said two registering members being adapted to be successively engaged and actuated by the actuator, of means, dependent for operation upon the actuator, for moving said support into position to effect the engagement with the actuator of the register-wheels prior to the indicating movement, and their disengagement therefrom upon the termination thereof, and for effecting the disengagement and engagement of the carrying devices and actuator prior to and after the engagement and disengagement respectively of the register-wheels, substantially as described.

30. In a cash-register, the combination with indicating devices, an oscillating actuator, clutches for connecting it with the indicating devices, and registering mechanism comprising register-wheels and carrying devices therefor, said two registering members being adapted to be successively engaged and actuated by the actuating mechanism, of means dependent for operation upon the actuating mechanism, for effecting the engagement with the actuator of one member of the registering mechanism and the disengagement therefrom of the other member, on the movement of the actuator in one direction, and vice versa on its return, substantially as described.

31. In a cash-register, the combination with indicating devices, an actuator, clutches for connecting it with the indicating devices, and registering mechanism comprising register-wheels and carrying devices therefor, said two registering members being adapted to be successively engaged and actuated by the actuating mechanism, of means, dependent for operation upon the actuating mechanism, for effecting the engagement with the actuator of the register-wheels and the disengagement therefrom of the carrying devices prior to the forward or indicating movement of the actuator, and vice versa on its return, substantially as described.

32. In a cash-register, the combination with indicating devices, registering mechanism, comprising register-wheels and carrying devices therefor, and mechanism for actuating the indicating devices and for successively actuating said register-wheels and carrying devices, said actuating mechanism comprising a movably-mounted member for actuating the latter, of means, dependent for operation upon the actuating mechanism for moving said movable member into and out of operative position, substantially as described.

33. The combination with a primary registering-wheel and a secondary registering-wheel, of a carrying-pawl movable into and out of operative relation to its actuating mechanism, mechanism for actuating said pawl, means for holding said pawl normally out of operative relation to its actuating mechanism, and means controlled by the primary wheels for moving said pawl into such operative relation, substantially as described.

34. The combination with a primary registering-wheel and a secondary registering-wheel, of a carrying-pawl movable into and out of operative relation to its actuating mechanism, mechanism for actuating said pawl, means for holding said pawl normally out of operative relation to its actuating mechanism, means moving with the primary wheel for releasing it, and means for moving it into operative position when released, substantially as described.

35. The combination with a primary registering-wheel and a secondary registering-wheel, of a carrying-pawl movable into and out of operative relation to its actuating mechanism, a shaft for actuating said pawl, means for rotating it, means for holding said pawl normally out of operative relation to said shaft, means moving with the primary wheel for releasing it, and means for moving it into operative position when released, substantially as described.

36. The combination with a primary registering-wheel and a secondary registering-wheel, of a pivoted pawl-carrying arm movable into and out of operative relation to its actuating mechanism, mechanism for actuating said arm, means for holding said arm normally out of operative relation to its actuating mechanism, and means controlled by the primary wheel for moving said arm into such operative position, substantially as described.

37. The combination with a primary registering-wheel and a secondary registering-wheel, of a pivoted pawl-carrying arm movable into and out of operative relation to its actuating mechanism, mechanism for actuating said arm, means for holding said arm normally out of operative relation to its actuating mechanism, means moving with the primary wheel for releasing it, and means for moving it into operative position when released, substantially as described.

38. The combination with a primary registering-wheel and a secondary registering-wheel, of a pivoted pawl-carrying arm movable into and out of operative relation to its actuating mechanism, a shaft for actuating said arm, means for rotating it, means for holding said arm normally out of operative relation to said shaft, means moving with the primary wheel for releasing it, and means for moving it into operative position when released, substantially as described.

39. The combination with a primary registering-wheel and a secondary registering-wheel, of a carrying-pawl for actuating the secondary wheel, a shaft for operating said carrying-pawl to actuate the secondary wheel, means for rotating said shaft, means for holding said pawl out of position for engagement, means moving with the primary wheel for releasing it, and means for automatically shifting said shaft into and out of operative position, substantially as described.

40. In a cash-register, the combination with the actuating-shaft, of a tappet-shaft geared thereto, a series of totalizer-wheels adapted to be geared independently to the indicating mechanism carrying-arms having actuating-pawls engaging with the totalizer-wheels, catches for holding said arms out of the path of the movement of the tappets, releasing-studs upon the inferior wheels of the series for disengaging the catches, and springs for bringing the arms after their release into the path of movement of the tappets; substantially as described.

41. In a cash-register, the combination with the actuating-shaft, of a tappet-shaft geared thereto, a series of totalizer-wheels adapted to be geared independently to the indicating mechanism, carrying-arms having actuating-pawls engaging with the totalizer-wheels, catches for holding said arms out of the path of movement of the tappets, releasing-studs upon the inferior wheels of the series for disengaging the catches, springs for bringing the arms after their release into the path of movement of the tappets, means for shifting the tappets out of line with the carrying-arms during the forward movement of the indicating mechanism, and means for restoring the tappets to their original position during the return movement of the indicating mechanism; substantially as described.

42. In a cash-register, the combination with the actuating-shaft, of a series of independent indicator-controlling gears mounted thereon, and a totalizer consisting of a tiltable frame, a series of totalizer-wheels corresponding to the indicator-controlling gears and adapted to engage therewith when the frame is tilted, carrying arms and pawls between the totalizer-wheels, a tappet-shaft normally out of operative relationship to said arms and pawls during the indicating operation, and means for bringing said tappet-shaft into such relationship at the terminating of the indicating operation; substantially as described.

43. In a cash-register, the combination with the tilting frame carrying the totalizing mechanism, of the tappet-shaft longitudinally movable therein for operating the totalizing mechanism and having a conical end, an incline upon which the said end rests and a spring acting from the opposite end of the shaft; substantially as described.

44. In a cash-register, the combination with an actuating-shaft, of a transverse tappet-shaft shiftable longitudinally upon the operation of the actuating-shaft, and a bell-gong lever in the path of movement thereof, substantially as described.

45. In a cash-register, the combination with indicating mechanism including a series of concentric sleeves and an actuator and clutches for independently actuating them in indicating direction, of the independent spring-pinions for returning the sleeves at the end of the indicating movement, and an arm carried by the actuator for engaging the sleeves to aid in their return and aline the same, substantially as described.

In testimony whereof I affix my signature in presence of two witnesses.

FREDERICK L. FULLER.

Witnesses:
LA BANE SCHOONOORD,
F. W. GNICHTEL.